United States Patent [19]

Minami

[11] 4,031,503

[45] June 21, 1977

[54] ANTI-CORROSION ULTRASONIC TRANSDUCER
[75] Inventor: Hiroshi Minami, Kawasaki, Japan
[73] Assignee: Hokushin Electric Works, Ltd., Tokyo, Japan
[22] Filed: Aug. 19, 1975
[21] Appl. No.: 605,808
[30] Foreign Application Priority Data
Aug. 30, 1974 Japan .............................. 49-105078
[52] U.S. Cl. .................................. 340/11; 340/10; 340/17 R; 29/594
[51] Int. Cl.$^2$ ......................................... G01V 1/00
[58] Field of Search ............ 340/17, 10, 11; 29/594

[56] References Cited
UNITED STATES PATENTS
3,387,149   6/1968   Young .............................. 340/10 X Primary Examiner—Stephen J. Lechert, Jr.

[57] ABSTRACT

An ultrasonic transducer suitable for use in a corrosive environment and constituted by a disc-type electrostriction element affixed to a rigid body of greater thickness and suspended within a case by a diaphragm secured to the body at a vibration node, the case being filled with an electrically non-conductive elastomeric material.

4 Claims, 4 Drawing Figures

ANTI-CORROSION ULTRASONIC TRANSDUCER

BACKGROUND OF INVENTION

This invention relates generally to ultrasonic transducers for liquid level gauges, and more particularly to an ultrasonic transducer suitable for use in corrosive environments.

Ultrasonic liquid level measurement is fundamentally based on the emission of ultrasonic energy by a transmitter at a measuring station and the reflection of the transmitted energy from the surface of the liquid whose level is to be gauged to a receiver at the same station. Transmitted ultrasonic pulses are directed at the surface of the liquid through the vapor or gas thereabove. The elapsed transit time from the transmitter to the receiver is measured electronically and computed to provide an accurate measure of the distance between the measuring station and the liquid surface, thereby providing a reading of liquid level.

The ultrasonic measuring gauge is especially adapted to measure liquid level in mine shafts and oil wells, where in many instances the environment above the liquid level is corrosive in nature. In conventional forms of ultrasonic liquid-level measuring gauges, the transducer includes an electrostriction element having thin-film electrodes made of a conductive metal, such as silver, formed on its faces so as to produce homogeneous electrostriction. When an element of this type is subjected to a corrosive gas, it is eroded thereby and ultimately rendered inoperative.

In ultrasonic transducers of the type heretofore employed, such as that disclosed in Japanese Utility Model Ser. No. 37192/1974, the electrostriction element is disc-shaped and is affixed to a rigid solid body of greater thickness. This body serves to reduce the inherent resonance frequency of the electrostriction element to an extent affording a resonance frequency in a range suitable for liquid level measurement. The element and rigid body affixed thereto are supported within a case by an ordinary flange secured to a nodal point on the body.

Such known types of ultrasonic transducers have serious practical deficiencies, quite apart from the fact that they are subject to corrosion. Because of the flange arrangement, a considerable amount of ultrasonic energy is dissipated radially through the flange, this leakage markedly reducing the efficiency of the transducer.

Moreover, with existing types of ultrasonic transducers, the same transducer cannot always be used both as a transmitter and a receiver, in that when functioning to measure short distances, the vibrations of the transducer at the termination of transmission are not arrested or damped with sufficient rapidity to render the same transducer operative as a receiver at the instant the echo pulse reflected from the liquid surface arrives. It has, therefore, heretofore been necessary to provide separate transducers for transmission and reception for measuring short distances.

SUMMARY OF INVENTION

In view of the foregoing, it is the main object of the present invention to provide an improved ultrasonic transducer which is of inexpensive design and which operates with a high degree of efficiency in a corrosive environment.

More particularly, it is an object of this invention to provide an anti-corrosion ultrasonic transducer capable of acting both as a transmitter and as a receiver in a liquid level gauge adapted to measure short distances between the gauge and the surface of the liquid.

Still another object of the invention is to provide a hermetically-sealed ultrasonic transducer in which an electrostriction element is so supported within a case as to minimize leakage of ultrasonic energy.

Briefly stated, these objects are accomplished in an ultrasonic transducer including a disc-shaped electrostriction element having a solid body affixed thereto, the element and the body being suspended within a case by a corrugated diaphragm secured to the body at a nodal point thereon, the element and body being potted within the case by an electrically non-conductive elastomeric material.

OUTLINE OF THE DRAWING

For a better understanding of the invention as well as other objects and further features thereof, reference is made to the following detailed description to be read in conjunction with the accompanying drawings, wherein.

DESCRIPTION OF INVENTION

Figure 1A:
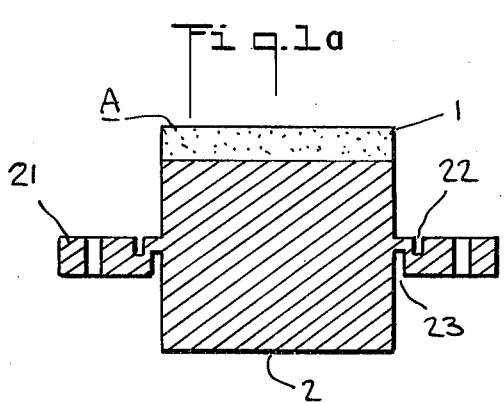
FIG. 1(a) is a section taken through a conventional single-unit ultrasonic transducer.

Prior Art Units:

Referring now to FIG. 1(a), there is shown a known type of ultrasonic transducer which is in cylindrical form and generally designated by letter A. The unit is constituted by a disc-shaped electrostriction element 1, to which is affixed a rigid, solid body 2. Body 2 functions to reduce the inherent natural frequency of element 1 to a degree causing it to resonate within a frequency range applicable to liquid level measurement.

The thickness of body 2 is substantially greater than that of electrostriction element 1, as a result of which the vibratory node thereof is axially shifted into the body. The element and body are supported by means of a flange 21 secured to the body at the nodal point thereon. Ring-shaped channels 22 and 23 are formed, respectively, on the upper and lower faces of the flange.

Figure 1B:
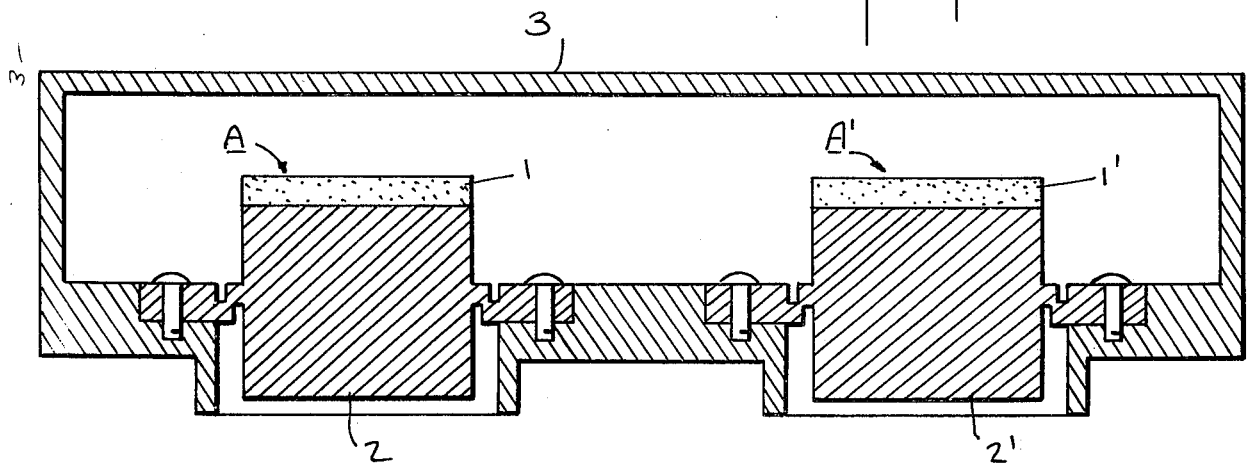
FIG. 1(b) is a section taken through a conventional double-unit ultrasonic transducer.

In FIG. 1(b), the transducer is formed by a pair of units A and A', each of the type shown in FIG. 1(a), the two units being disposed in side-by-side relation within a case 3.

The transducer shown in FIG. 1(a) is susceptible to damage from corrosive gas, which is the reason for its installation in case 3 in FIG. 1(b), the case being hermetically sealed. The reason two units are incorporated within the case is that for measuring short distances, one cannot use the same unit both as a transmitter and a receiver, for the vibrations of the unit cannot be arrested or damped in sufficient time to permit reception of an echo pulse from the surface of the liquid or whatever other target is being measured. Since a separate transducer must be used for receiving echo pulses, the conventional apparatus is relatively large, complicated and costly. Moreover, because of the relatively rigid flange support, a substantial amount of radially-transmitted ultrasonic energy leaks out through the flange and is wasted.

Figure 3:
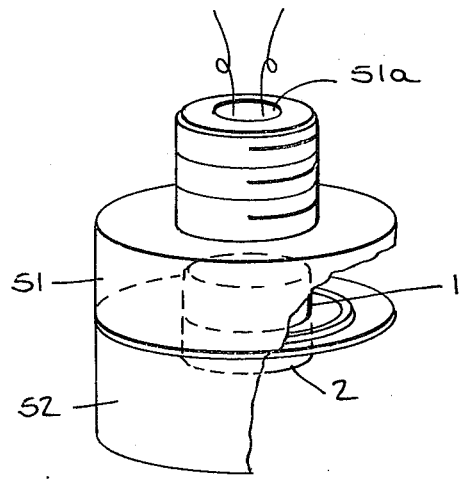
FIG. 3 is a perspective view of the unit shown in FIG. 2, the case being cut away to expose the interior thereof.
Figure 2:
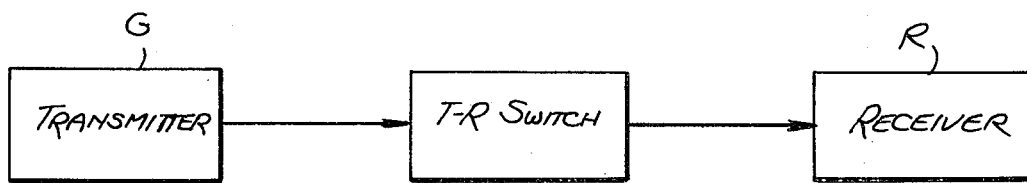
FIG. 2 is a section taken through an ultrasonic transducer in accordance with the invention.
Figure 2:
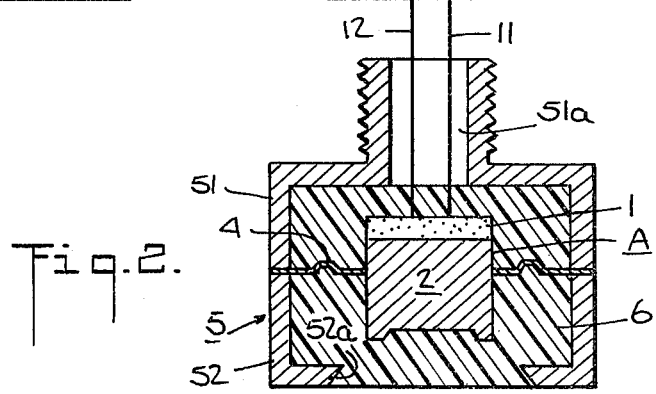

Preferred Embodiment:

In an ultrasonic transducer in accordance with the invention, as illustrated in FIGS. 2 and 3, the unit A therein corresponds to Unit A in FIG. 1(a). A high frequency voltage from a generator is applied thereto through lead wires 11 and 12. However, unit A functions both to transmit and receive, and when the unit is switched by a T-R switch from the high-frequency generator G to a receiver R, the signal derived from the echo pulses are fed through the same lead wires 11 and 12 to a receiver.

Unit A is suspended within a cylindrical case 5 by means of a corrugated annular diaphragm 4 whose inner periphery is welded or otherwise attached to body 2 at the nodal point thereon and whose outer margin is sandwiched between the upper section 51 of the case and the lower section 52 thereof.

Upper section 51 of the case is provided with an outlet having a passage 51(a), through which extend lead wires 11 and 12, while lower section 52 is provided with a relatively large mouth 52a through which ultrasonic pulses are launched and echo pulses are received. Unit A is potted within the case by means of an elastomeric, electrically non-conductive material such as polyurethane gum which fills the free space within the case interior. The potting material does not interfere with transmission and reception of ultrasonic energy or with the signals carried by lead wires 11 and 12, but it does serve to isolate unit A from the corrosive environment.

Thus the ultrasonic transducer in accordance with the invention has the following significant features:

A. Because the unit is protectively potted within its case, it is not susceptible to erosion in a corrosive environment and may be used without difficulty for taking liquid level measurement in mine shafts and in other environments where ordinary transducers are adversely affected.

B. Because of its suspension within the case by a corrugated diaphragm, leakage of ultrasonic energy through the compliant support is much less than with the usual rigid flange support.

C. Because of the complaint support and the fact that the unit is embedded in an elastomeric medium, the vibratory action of the unit is quickly damped upon the termination of its excitation, so that the efficiency of the unit is improved and it becomes possible to use the unit both for transmission and reception.

While there has been shown and described a preferred embodiment of an anti-corrosion ultrasonic transducer in accordance with the invention, it will be appreciated that many changes and modifications may be made therein without, however, departing from the essential spirit thereof.

I claim:

1. An ultrasonic transducer comprising:
   A. a cylindrical case provided at one end with an opening;
   B. an ultrasonic unit disposed within said case, said unit consisting essentially of a disc-shaped electrostriction element having an inherent resonance frequency, and a relatively thick rigid body affixed thereto which reduces the natural frequency of the element to a degree axially shifting the vibratory nodal point thereof into said body, means suspending said unit from said nodal point to occupy a position within said case in which it is spaced from the inner surface of the case and from said opening;
   C. an electrically non-conductive elastomeric material filling the free-space within said case and embedding the unit therein to permit ultrasonic energy to be emitted by said unit or received thereby through said opening, said energy being conveyed by said filling material which otherwise serves to isolate said unit from the environment in which the transducer is installed.

2. A transducer as set forth in claim 1, wherein said unit is suspended in said case by a corrugated diaphragm.

3. A transducer as set forth in claim 1, wherein said material is a polyurethane gum.

4. A transducer as set forth in claim 1, wherein said transducer is alternately coupled through a transmitter-receiver switch to a high-frequency pulse generator and to a receiver.

* * * * *